United States Patent [19]

Steinbach et al.

[11] Patent Number: 4,671,711
[45] Date of Patent: Jun. 9, 1987

[54] KEY-CUTTING MACHINE

[75] Inventors: Robert L. Steinbach, Glendale Heights; Joseph P. Tauber, Chicago, both of Ill.

[73] Assignee: Chicago Lock Co., Chicago, Ill.

[21] Appl. No.: 557,912

[22] Filed: Dec. 5, 1983

[51] Int. Cl.$^4$ .............................................. B23C 3/35
[52] U.S. Cl. ........................................ 409/82; 76/110
[58] Field of Search ................ 409/82, 81, 83; 76/110

[56] References Cited

U.S. PATENT DOCUMENTS

| | | | |
|---|---|---|---|
| 1,850,311 | 3/1932 | Beisser | 409/81 |
| 1,978,009 | 10/1934 | Caron | 409/82 |
| 2,129,087 | 9/1938 | George et al. | 409/82 |
| 2,129,883 | 9/1938 | Stull | 409/82 |
| 3,418,882 | 12/1968 | Brand | 409/82 |
| 3,495,482 | 2/1970 | Simon | 76/110 |
| 3,818,798 | 6/1974 | Kotov et al. | 409/82 |
| 4,022,107 | 5/1977 | Falk | 409/82 |
| 4,203,693 | 5/1980 | Schwartz et al. | 409/81 |
| 4,411,567 | 10/1983 | Agius | 409/82 |

OTHER PUBLICATIONS

"Locksmith Ledger," vol. 39, No. 5, Apr. 1979, Section 1, pp. 55-58.
"Locksmith Ledger," vol. 40, No. 5, Apr. 1980, Section 1, pp. 37-39 and 66-67.
"Operating Instructions—Tubular Key Cutting Machine No, KM7", Fort Lock Corp. River Grover, Ill., Rev.6-20-79, 13 pages.

Primary Examiner—Z. R. Bilinsky
Attorney, Agent, or Firm—Gerlach & O'Brien

[57] ABSTRACT

A machine for cutting flat keys having extending tumbler-receiving recesses includes a mount for a key blade blank, a mount for a cutter, mechanism mounting the blank mount and the cutter mount for movement relative to each other for cutting a longitudinal tumbler-receiving recess in a blade blank mounted on the blank mount with a cutter mounted on the cutter mount, and mechanism mounting the blank mount and the cutter mount for adjustment of their relative positions to adjust the position of the cutter transversely with respect to the blade blank, whereby a plurality of tumbler-receiving recesses may be cut in the blank thereacross. A holder for the blade blank is pivotally mounted on the blank mount for 180-degree rotation about the longitudinal axis of the blank, whereby the recesses may be cut in opposite sides of the blank.

17 Claims, 21 Drawing Figures

KEY-CUTTING MACHINE

BACKGROUND OF THE INVENTION

This invention relates to key-cutting machines, particularly to machines for cutting flat key blade blanks to provide longitudinal tumbler-receiving recesses therein. More particularly, the invention relates to a machine for cutting flat keys for cylinder locks having coplanar lock tumblers, which keys are of the type disclosed in copending U.S. patent application Ser. No. 685,595, filed on Dec. 24, 1984 as continuation of application Ser. No. 360,886, filed on Mar. 23, 1982.

The key of the foregoing application is provided with tumbler-receiving recesses, which extend longitudinally in each side of the blade from a distal end thereof. Transverse shoulders formed at the inner ends of the recesses provide bittings on the key blade, for engagement with the ends of longitudinally movable coplanar lock tumblers. Each recess and its associated bitting is formed in the blade by a cutting process, which removes material from a suitable blade blank.

Heretofore, key-cutting machines have been provided, for making tubular keys for cylinder locks. The machines form longitudinally extending recesses in tubular blanks, by a cutting process, and the recesses terminate in shoulders providing bittings that engage the ends of longitudinally movable lock tumblers. Such machines are disclosed in U.S. Pat. Nos. 1,978,009, 2,129,087, 3,418,882, 3,495,482, 3,818,798, 4,022,107, and 4,203,693. The prior machines are not adapted for cutting flatbladed keys, so that a need exists for such a machine.

SUMMARY OF THE INVENTION

It is an object of the invention to provide a key-cutting machine especially adapted for cutting longitudinal recesses providing bittings in flat keys.

It is a further object to provide such a machine which can be operated by relatively unskilled personnel. More particularly, it is an object to provide such a machine which requires a minimum of adjustments and manipulations of the machine by an operator to cut a plurality of such recesses in a key, following ever-changing key codes, rapidly, accurately, and with low rejects.

Another object is to provide such a machine which is economical to construct and to operate, is rugged and durable, and requires relatively little maintenance.

A flat key-cutting machine in accordance with the invention includes a mount for a flat key blade blank, a mount for a cutter, means mounting the blank mount and the cutter mount for movement relative to each other for cutting a longitudinal tumbler-receiving recess in a blade blank mounted on the blank mount with a cutter mounted on the cutter mount, and means mounting the blank mount and the cutter mount for relative movement into successive adjustment positions relative to each other to adjust the position of the cutter transversely with respect to the blade blank, whereby a plurality of tumbler-receiving recesses may be cut in the blank thereacross.

Preferably, the machine includes a holder for the blade blank, and means pivotally mounting the holder on the blank mount for 180-degree rotation about the longitudinal axis of the blank, whereby the tumbler-receiving recesses may be cut opposite sides of the blank.

BRIEF DESCRIPTION OF THE DRAWINGS

The attached drawings illustrate a preferred embodiment of the key-cutting machine of the invention, without limitation thereto. In the drawings, like elements are identified by like reference symbols in each of the views, and.

DESCRIPTION OF THE PREFERRED EMBODIMENTS

Referring to FIGS. 1-6 of the drawings, a key-cutting machine 30 constitutes a preferred embodiment of the invention. The machine 30 is adapted for cutting a blade blank 32 attached to a handle or bow 33 in a flat key blank 34, to provide a finished key 36 having a bitted blade 38.

Figure 3:
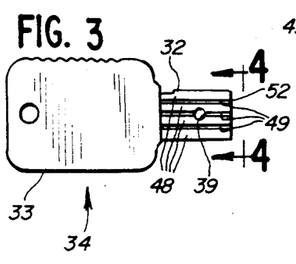
FIG. 3 is a side elevational view of a flat key blank, as it appears prior to cutting recesses in a blade blank thereof.
Figure 4:
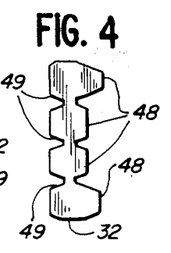
FIG. 4 is an enlarged end elevational view of the key blank of FIG. 3, taken on line 4—4 thereof.

The blade blank 32 has a plurality of parallel longitudinally extending lands 48 separated by parallel longitudinally extending grooves 49 on each of its opposite sides, both extending for the length of the blank. In the illustrative blade blank 32, there are four lands 48 alternating with three grooves 49 on each side of the blade blank. A key-retention opening 39 extends between opposite sides of the blade blank 32, substantially centrally between its longitudinally extending edges. In the illustrative article, the blade blank 32 is constructed of a suitable metal, and the handle 33 is formed of a thermoplastic material and molded on or otherwise fixed to one end of the blade blank.

Figures 5, 6:
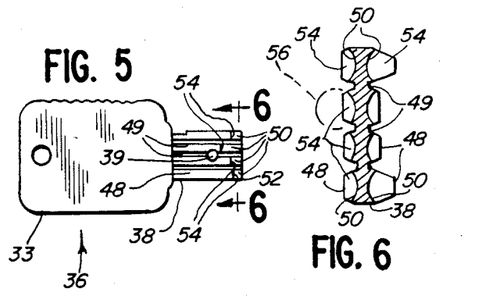
FIG. 5 is a side elevational view of a key made from the key blank of FIG. 3, by cutting recesses in the blade blank of the latter.
FIG. 6 is an enlarged cross-sectional view of the key of FIG. 5, taken on line 6—6 thereof.

Operation of the machine 30 serves to cut a recess 50 in each of the lands 48, to produce the finished key 36. Each recess 50 extends longitudinally in its land, from a distal end 52 of the blade. Each recess 50 terminates in a bitting 54 formed by a transverse shoulder on the land, which bitting is spaced inwardly from the distal end 52 for a distance determined by the key code, which corresponds to the code of its companion lock. The recesses 50 include recesses of different lengths in each key 36, and the combination of lengths varies from key to key, according to the code.

The recesses 50 may be cut in the blade blank 32 by the machine 30 with or without the handle 33 attached to the blade blank. The illustrative procedure of cutting the blade blank 32 after the handle 33 has been attached to it is preferred, for efficiency and economy in the manufacture of the finished key 36. Referring to FIG. 6, the illustrative recesses 50 are arcuate in cross section, for receiving portions of longitudinally extending coplanar cylindrical tumblers 56 therein. A minor portion of the outer end surface of each tumbler abuttingly engages a bitting 54, when the key is inserted into its lock.

Referring to FIGS. 1, 2, 8 and 9, the machine 30 includes a base or supporting structure 40, a cutter mounting and drive assembly 42, a key blade blank mounting assembly 44, and an operating mechanism 46. The base 40 includes a rectangular, normally horizontal bedplate 62 supported on top of L-shaped legs 64 having upright sections 68 and footings 70. Bolts 66 extend through the bedplate 62 and into the upright sections 68, to secure them together, and the footings 70 may be mounted on and secured to a workbench or other suitable support, not illustrated.

Figure 1:
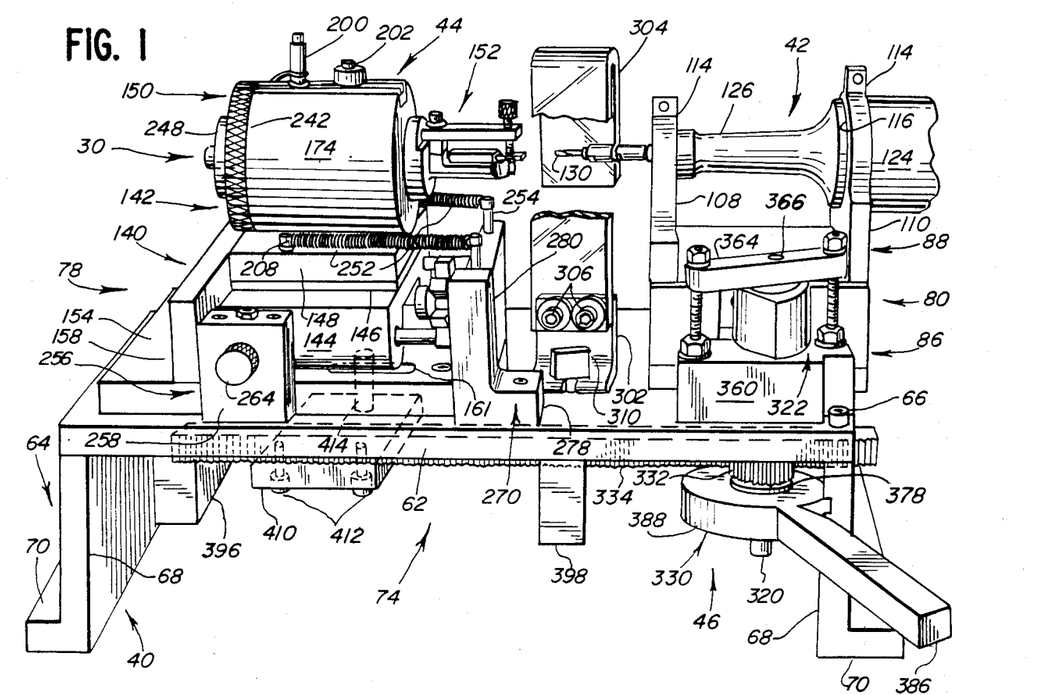
FIG. 1 is a front perspective view of a preferred embodiment of the key-cutting machine, with parts broken away, showing the parts in their positions prior to cutting a recess in the blade blank of a key blank mounted on the machine.

The machine 30 is viewed in FIG. 1 from the side on which an operator works, referred to herein as the front side, identified by the number 74. The remaining sides then become the back, left-hand and right-hand sides 76, 78 and 80, respectively. The cutter mounting and drive assembly 42 is mounted on top of the bedplate 62, adjacent to the right-hand side 80 of the machine. The key blank mounting assembly 44 is mounted on top of the bedplate 62, adjacent to the left-hand side 78 of the machine, in longitudinally spaced apart opposed relation to the cutter mounting and drive assembly 42. The bedplate 62 is provided with a circular shaft opening 82 (FIG. 16) in spaced apart adjacent relation to the right-hand side 80, for cooperation with the operating mechanism 46. The bedplate 62 also is provided with an elongate slot 84 (FIGS. 8 and 9) beneath the key blade blank mounting assembly 44, for cooperation with the operating mechanism 46. A longitudinal axis of the slot 84 extends longitudinally of the bedplate 62, i.e., in a direction from the left-hand side 78 to the right-hand side 80.

Figure 2:
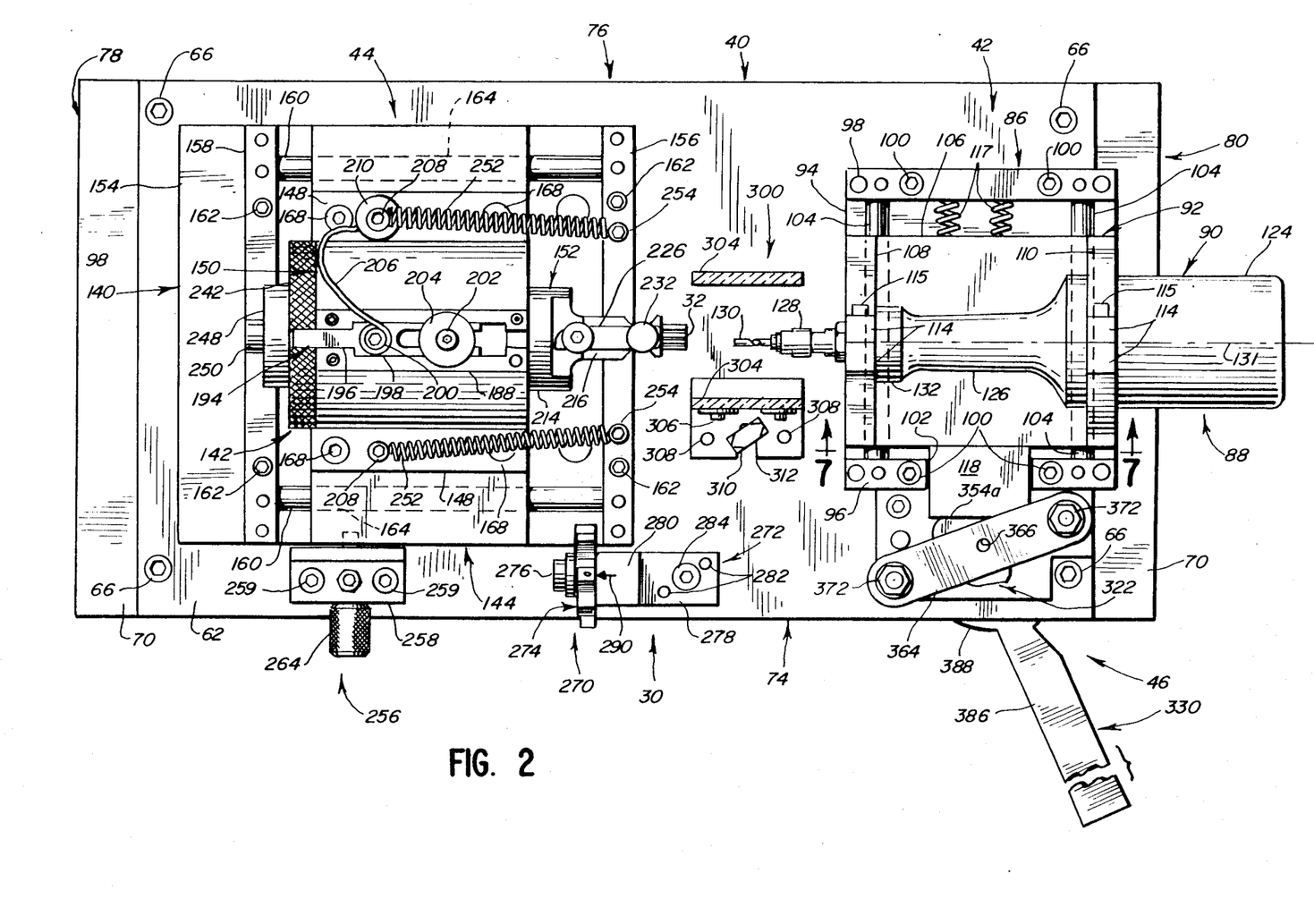
FIG. 2 is a top plan and partly sectional view of the same.
Figure 7:
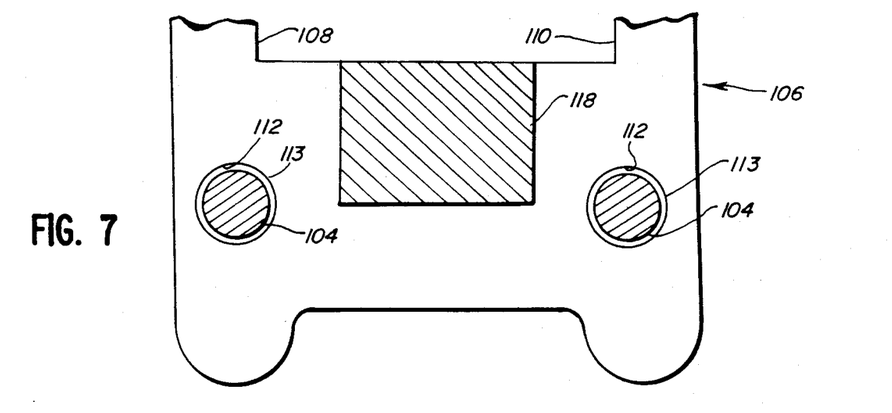
FIG. 7 is a fragmentary cross-sectional view of a portion of the machine, taken on line 7—7 of FIG. 2, showing a cutter mount in the machine.

Referring to FIGS. 1, 2 and 7, the cutter mounting and drive assembly 42 includes a rectangular, channel-shaped cutter mount cradle 86, and a cutter mount 88 received in the cradle. The cutter mount 88 includes a cutter drive unit 90 and a carriage 92 for the drive unit.

The cradle 86 is constructed of a rectangular baseplate 94 fixedly secured to the bedplate 62 on top thereof, and a pair of longitudinally extending spaced parallel upstanding front and back side walls 96 and 98, respectively. The side walls 96 and 98 are secured to the baseplate 94 normal thereto, by bolts 100. The front side wall 96 is provided with a rectangular window opening 102 therein, which extends downwardly from the top of the wall. Two spaced parallel cylindrical slide rods 104 extend between the side walls 96 and 98, transversely of the machine 30, and the opposite ends of the rods are fixed to the walls.

The cutter drive unit carriage 92 is constructed integrally of a reciprocating table 106, which is rectangular when viewed from above, and inner and outer generally C-shaped drive unit clamps 108 and 110, respectively, disposed in longitudinally spaced apart parallel relation on top of the table, at opposite ends thereof. Two cylindrical rod-receiving bores 112 (FIG. 7) extend through the table 106 in spaced parallel relation, adjacent to its opposite ends, and sleeve bearings 113 are mounted therein. Each of the clamps 108 and 110 is constructed as a split ring, which terminates on top thereof in a pair of spaced apart lugs 114. The lugs in each pair are drawn together by a bolt 115 which extends therethrough.

The carriage 92 is mounted on the cradle 86 with the slide rods 104 received within the bearings 113, whereby the carriage is slidably movable on the rods, reciprocatingly between the side walls 96 and 98 of the cradle 86, and transversely of the machine 30 and the bedplate 62 thereof in rectilinear motion. In this connection, it will be seen in FIG. 2 that the width or transverse dimension of the carriage 92 is substantially less than the distance between the side walls 96 and 98 of the cradle 86, to provide for such movement.

Two coil compression springs 117 are mounted to extend from the inside of the cradle back side wall 98, transversely of the machine, into engagement with the adjacent back side of the table 106, to bias the table in the direction of the front side 74 of the machine. A cam follower 118 in the form of a rectangularly shaped block is fixed to the front side of the table 106 and extends through the window opening 102 in the front side wall 96.

The cutter drive unit 90 is a conventional unit embodying a motor 124 which rotates a drive shaft (not shown) carried in a reduced diameter casing 126. A circular inner end 127 of the drive unit casing 126 and the circular motor 124 are inserted into the openings 116 of corresponding size and shape in the clamps 108 and 110, respectively, and clamped therein by tightening the lug bolts 115. As thus mounted, the drive unit 90 is fixedly secured to the carriage 92 for rectilinear transverse movement therewith on the machine 30.

A collet 128 is coupled to the drive shaft of the drive unit 90, and it serves to rigidly support a cutter or cutting tool 130 for being driven by the drive shaft to rotate at high speed about a horizontal, longitudinal axis 131 of the drive shaft and of the cutter. In the preferred illustrative embodiment, the cutter 130 is an end mill, having a transverse cutting face on its outer end. Other cutting tools which may be employed include a bur, rotary file, abrasive wheel, or other preferably end-cutting tool functioning to cut a longitudinal recess 50 in a blade blank 32 from its distal end 52.

Figure 8:
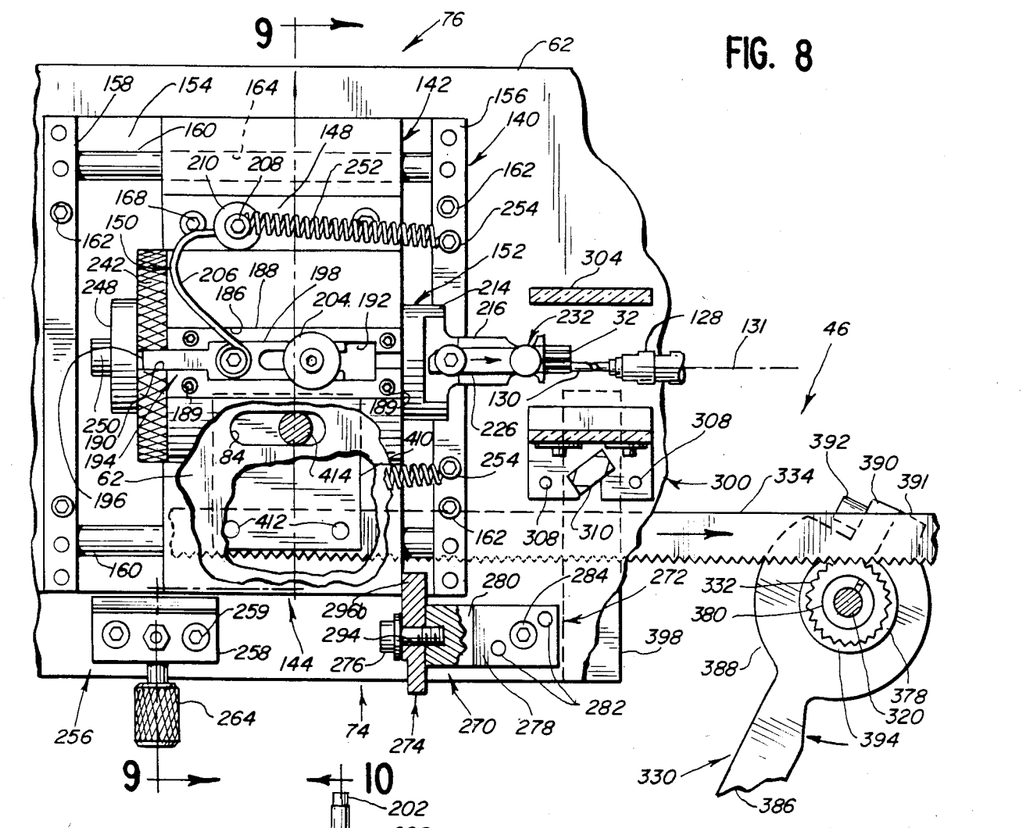
FIG. 8 is a fragmentary top plan view of the machine, similar to FIG. 2 and on the same scale, with parts broken away, showing the parts in their positions prior to cutting a recess in the key blade blank and with the blank substantially abutting on a cutter.
Figure 9:
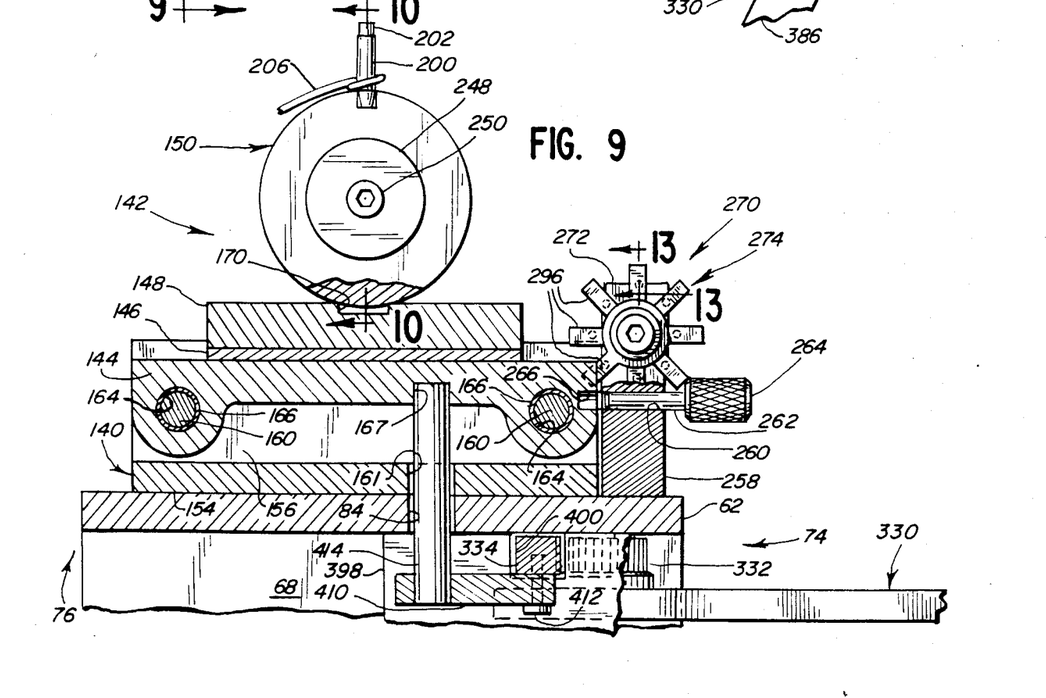
FIG. 9 is a fragmentary cross-sectional view of the machine, taken substantially on lines 9—9 of FIG. 8 and on substantially the same scale with parts broken away.

Referring to FIGS. 1, 2 and 8-12, the key blade blank mounting assembly 44 includes a generally rectangular, channel-shaped blank mount cradle 140, and a key blade blank mount 142 received in the channel thereof. Referring particularly to FIG. 9, the blank mount 142 includes a reciprocating table 144, a spacer 146 on the table, a housing base 148 on the spacer, and a blank holder housing 150 on the base. As illustrated in detail in FIG. 10, a key blade blank holder 152 is pivotally mounted on the holder housing 150.

Referring to FIGS. 1, 2, 8 and 9, the blank mount cradle 140 includes a baseplate 154, longitudinally spaced parallel inner and outer side walls 156 and 158 upstanding on the baseplate, and two transversely spaced cylindrical slide rods 160 extending longitudinally and horizontally between the side walls 156 and 158. The baseplate 154 is fixedly secured to the bedplate 62 on its upper surface. The baseplate 154 is provided with an elongate slot 161, in registry with the slot 84 in the bedplate 62. The slide rods 160 are fixedly secured at their opposite ends to the side walls 156 and 158, and the walls are fixedly secured to the baseplate 154, by bolts 162.

The blank mount table 144 is received between the side walls 156 and 158 of the blank mount cradle 140. The table 144 is provided with a pair of spaced parallel longitudinally extending cylindrical rod bores 164. A sleeve bearing 166 is disposed in each of the bores 164, and each bearing 166 receives therethrough one of the slide rods 160 of the blank mount cradle 140. The table 144 is rectangular in plan view, extends for the width of the cradle baseplate 154, and extends longitudinally for a distance substantially less than the distance between the side walls 156 and 158. The table 144 thus is mounted for reciprocable sliding movement in the cradle 140, longitudinally and horizontally between the side walls 156 and 158 in rectilinear motion. A circular pin-receiving recess 167 is provided in the bottom of the table 144, and it registers with the bedplate and cradle slots 84 and 161 in the several longitudinal positions of the table.

The spacer 146 and the base 148 are coextensive rectangular plates, which are fixedly secured to the table 144 on its upper surface, by means of bolts 168 (FIG. 2). The base 148 has a longitudinally extending rectangular groove 170 in its upper surface, for seating the holder housing 150 on the base, the base and the housing being fixedly secured together by a bolt means, not illustrated. The spacer 146 is precision ground, for locating the housing 150 accurately in an operating position.

Referring particularly to FIGS. 8-12, the blank holder housing 150 and the blank holder 152 provide supporting structure for a key blank 34, wherein the holder 152 is pivotally mounted on the housing 150 for rotation about a horizontal, longitudinal axis 172 of the housing and of the holder. The housing 150 includes a substantially cylindrical tubular body 174 having a cylindrical bore 176 extending therethrough. Counterbores 178 and 180 respectively at the inner and outer ends of the body bore 176 provide annular seats for inner and outer holder thrust bearings 182 and 184, respectively.

Figures 10, 11, 12:
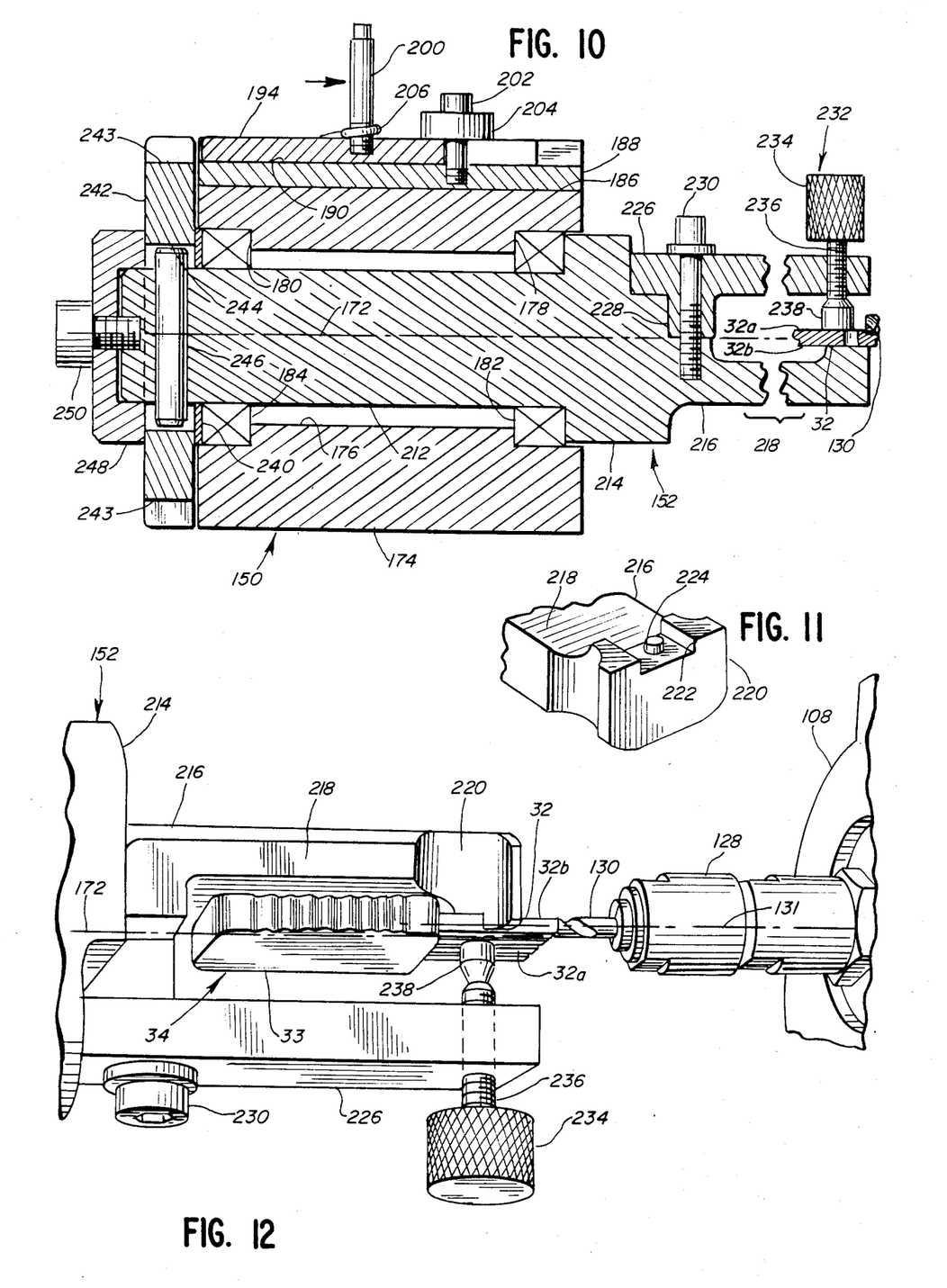
FIG. 10 is an enlarged broken axial longitudinal sectional view of structure supporting a key blank on the machine, in position for being cut, taken substantially on line 10—10 of FIG. 9.
FIG. 11 is a further enlarged fragmentary perspective view of a portion of a holder for the key blank, included in the structure illustrated in FIG. 10.
FIG. 12 is a similarly enlarged fragmentary perspective view of parts of the holder, including the portion illustrated in FIG. 11, showing the holder inverted with respect to the position illustrated in FIGS. 10 and 11, and including a fragmentary perspective view of a cutter and its supporting and operating structure.

Referring to FIGS. 8 and 10, a generally rectangular groove 186 is provided in the body 174 of the holder housing, and it extends for the length of the body. A generally rectangular body insert 188 is fixedly mounted in the groove 186, being secured to the body 174 by bolts 189. The insert 188 is provided with a latch bar groove 190 extending for its length, which includes a generally rectangular enlarged intermediate section 192 (FIG. 8).

A latch bar 194 is mounted in the groove 190, for reciprocal longitudinal sliding movement therein. The latch bar includes a tongue section 196 adjacent to the outer end of the groove 190, and an enlarged bifurcated section 198 received in the intermediate groove section 192. A handle 200 is secured to the top of the latch bar 94. A retaining bolt 202 is inserted between the bifurcations of the enlarged bar section 198, into threaded engagement with the insert 188, and a washer 204 is inserted between the head of the bolt and the latch bar, for retaining the latter in the insert. The latch bar 194 is slidable in the groove 190 from a withdrawn position, illustrated in FIG. 10, within the confines of the insert 188, to an outwardly projecting position, illustrated in FIGS. 2 and 8. A wire spring 206 has opposite ends looped around the handle 200 and one of two extension spring bolts 208, under a washer 210 thereon, which bolts are fastened to the housing base 148 (See FIGS. 2 and 8).

Referring particularly to FIGS. 10-12, the blank holder 152 includes a one-piece integral structure of a cylindrical shank 212, an enlarged circular shoulder 214, and a key bed 216, which structure is insertable in the bore 176 of the housing 150 and rotatable about the housing and shank axis 172.

The key bed 216 includes a key handle-receiving section 218, and a raised blade blank-receiving section 220. The blank-receiving section 220 is provided with an open-ended rectangular slot 222 therein, which closely receives a blade blank 32. A locating nib 224 is formed centrally of the base of the slot 222, and it is received in the retention opening 39 (FIG. 3) of the blade blank.

A blade blank clamp bar 226 having an integral laterally projecting stud 228 is pivotally mounted on the shoulder 214 of the holder 152, for rotation about a vertical axis, by means of a bolt 230 extending through the bar and the stud into threaded engagement with the inner end of the key bed 216. A screw clamp 232 is mounted on the clamp bar 226, adjacent to its outer end. The clamp includes a knurled head 234, a threaded stem 236, and an enlarged foot 238. The stem extends through the bar 226, in threaded engagement therewith, and is turned by turning the head 234, to bring the foot 238 into clamping engagement with a blade blank 32 seated in the slot 222 of the raised section 220. As illustrated in FIGS. 8 and 12, for example, the blank 32 projects outwardly from the holder 152, and longitudinally in the machine 30, towards the cutter 130.

The holder 152 is received within the housing body 174, with the inner surface of the shoulder 214 engaging the inner thrust bearing 182. At the outer end of the shank 212, a washer 240 is seated on the outer thrust bearing 184, and an annular latch plate 242 is seated on the washer, with the shank 212 extending through central circular openings therein. The latch plate 242 is provided with diametral latching and engagement notches 243 and 244, respectively, at its outer and inner peripheries. A capture pin 246 is inserted through the holder shank 212, and its opposite ends enter the engagement notches 244, to engage the latch plate 242 for rotation with the shank. A retainer cap 248 encloses the outer end of the holder shank 212, and a retainer bolt 250 extends freely through the cap, into threaded engagement with the end of the shank, thereby to cause the shoulder 214 to bear on the inner thrust bearing 182, the cap 248 to bear on the latch plate 242, and the latch plate to bear on the washer 240, in turn bearing on the outer thrust bearing 184.

By virtue of the foregoing construction, the blank holder 152 is rotatable about the longitudinal housing axis 172, between two positions 180° apart, respectively illustrated in FIGS. 10 and 12. In each position, the upper latching notch 243 is aligned with the latch bar groove 190. The tongue section 196 of the latch bar 194 will enter the upper notch 243, being resiliently biased thereinto by the wire spring 206, to prevent the latch plate 242 and the blank holder 152 in engagement therewith from rotating.

As illustrated in FIGS. 10 and 12, the longitudinal axis of the blank 32 as mounted in the holder 152 coincides with the longitudinal axis 172 of the holder. The longitudinal axis 131 of the cutter 130 is above, or vertically offset with respect to, the longitudinal axis 172 of the blade blank.

The opposite sides 32a and 32b of the blade blank 32 as mounted are reversed in the respective positions of rotation of the holder 152, illustrated in FIGS. 10 and 12. With the foregoing vertical spacing of the cutter axis 131, a lower portion of the cutter 130 is aligned with one of the lands 48 (FIG. 3) on the upper side of the blank 32, which is designated 32a in FIG. 10. In the reverse holder position of FIG. 12, the opposite side 32b of the blank 32 is the upper side, and a land 48 thereon is in alignment with the cutter portion. The cutter 130 thus may serve to cut a longitudinal tumbler-receiving recess 50 in one or more lands 48 on each side 32a and 32b of a blade blank 32, upon relative longitudinal movement of the blank mount 142 towards the cutter mount 88.

Referring to FIGS. 1, 2, 8 and 9, one end of each extension spring 252 is connected to an extension spring bolt 208 on the housing base 148, and the opposite end is connected to a bolt 254 mounted on top of the inner side wall 156 of the blank mount cradle 140. The springs 252 bias the blank mount 142 towards the center of the machine 30, and towards the cutter mount 88.

A catch 256 for the blank mount 142 is mounted on the bedplate 62, adjacent to the blank mount table 144. The catch includes a block 258 secured to the bedplate 62 by bolts 259. The block 258 has a pin-receiving opening 260 extending transversely therethrough, and a catchpin 262 is received in the opening and has a knurled outer head 264. A cylindrical notch or recess 266 is provided in the adjacent side surface of the table 144, for receiving the inner end of the catch pin 262 therein. The blank mount 142 may be held or latched in a retracted position by the catch 256, against the bias of the extension springs 252.

Referring to FIGS. 1, 2, 8, 9 and 13-15, a variable blank mount stop assembly 270 is mounted on the bedplate 62, adjacent to and extending over the baseplate 154 of the blank mount cradle 140. The stop assembly 270 includes an L-shaped standard or post 272, upstanding on the bedplate 62, a spoked gauge wheel 274, and a headed stud bolt 276. The standard 272 has a horizontally extending leg 278 and a vertically extending leg 280, each of rectangular cross section. The standard is oriented on the bedplate 62 and secured thereto by a pair of dowel pins 282 and a bolt fastener 284 (See FIGS. 2 and 8), which extend through the horizontal leg 278 into the bedplate. The vertical leg 280 is provided with a horizontal recess 286 (FIG. 13), serving to receive therein a detent 288 under the force of a compression spring 289. An index mark 290 (FIG. 2) is provided on top of the vertical leg 280.

Figure 13:
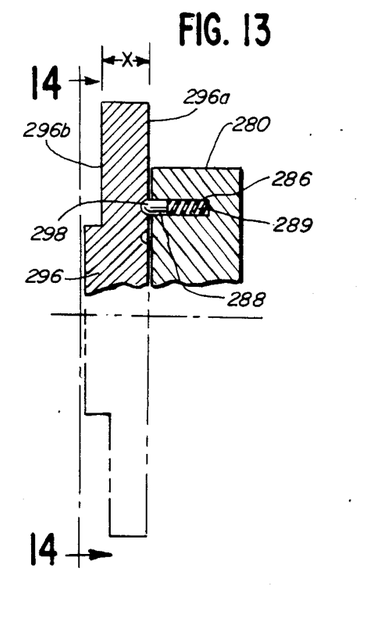
FIG. 13 is an enlarged fragmentary sectional view of a portion of a gauge wheel in a variable stop mechanism in the machine, taken substantially on line 13—13 of FIG. 9.
Figure 14:
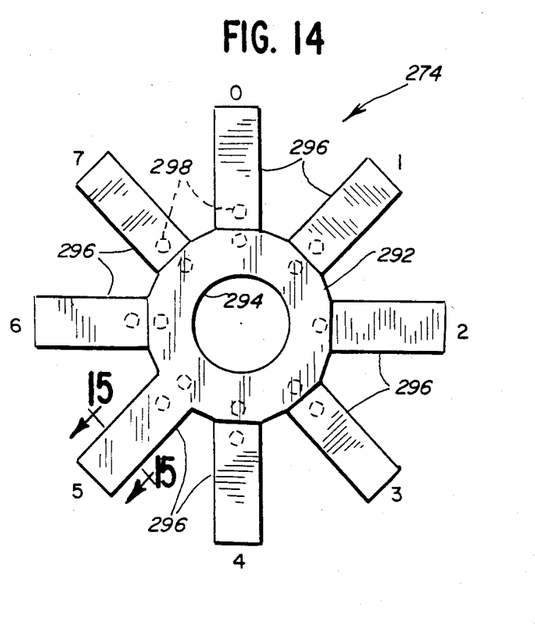
FIG. 14 is an enlarged side elevational view of the gauge wheel, taken substantially on line 14—14 of FIG. 13.
Figure 15:
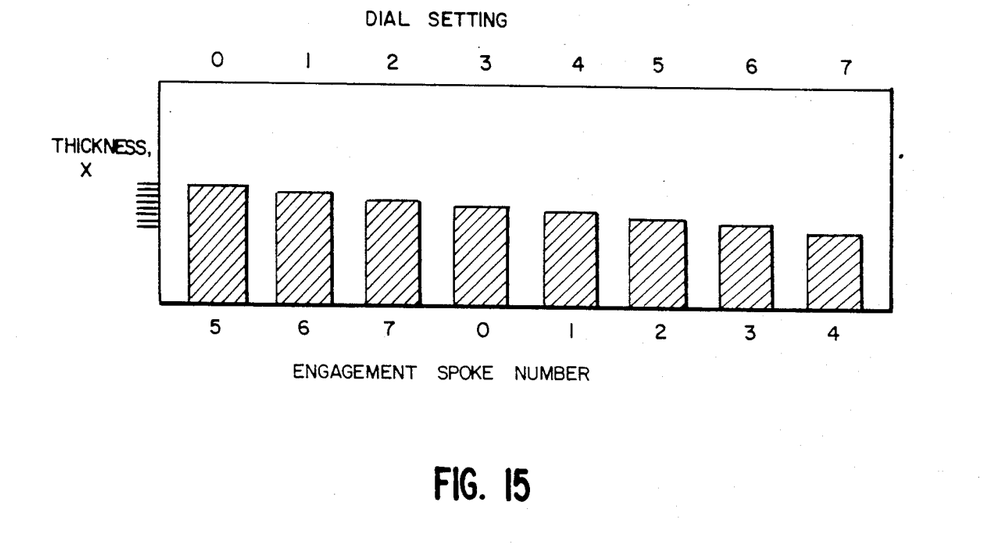
FIG. 15 is a bar chart relating the dial setting of the gauge wheel of FIG. 14 to the number and thickness of the wheel spoke which engages a key blade blank mount in the machine.

Referring to FIGS. 13-15, the gauge wheel 274 includes an annular hub 292 having a circular opening 294 extending axially therethrough, and eight spokes 296 extending radially and equiangularly outwardly from the hub, for equal distances. The spokes are generally rectangular in cross section and of varying thicknesses, and each is provided with a curved detent-receiving recess or dimple 298 in an inner face 296a thereof, facing the standard 272 when mounted thereon. The outer ends of the spokes 296 are provided with consecutive numerals, from 0 to 7, as numbered in FIG. 14, or they may be provided with other indicia. The respective spoke thicknesses x (FIG. 13) are graphically illustrated in the chart of FIG. 15. The inner faces 296a of the spokes are coplanar, whereas the outer faces 296b of the spokes lie in different planes, at differing distances from the plane of the inner faces 296a.

Referring to FIGS. 8 and 9, the gauge wheel 274 is mounted on the vertical leg 280 of the standard 272, for rotation about a horizontal axis, by insertion of the stud bolt 276 through the hub opening 294 and into threaded engagement with the leg. A spoke 296 in the 7-18 o'clock position (in FIG. 9) then is disposed in the movement path of the table 144, for abutting engagement therewith when the blank mount 142 is advanced towards the center of the machine 30. Which spoke is disposed in such path is determined by the setting of the gauge wheel 274. There are eight possible settings, corresponding to the eight spokes 296, and in each setting, the spoke 296 at the 12 o'clock position is engaged by the detent 288, received in the spoke recess 298.

The different settings of the gauge wheel 274 provide varying transverse planes of engagement between the inner side of the table 144 and the outer faces 296b of the spokes, which planes are spaced apart longitudinally. Consequently, the movement of the table 144, and likewise of the entire blank mount 142, will be arrested at varying distances of longitudinal travel from a starting point towards the center of the machine 30. Correspondingly, each different spoke 296 corresponds to a different longitudinal disposition of the blade blank 32 relative to the cutter 130.

Referring to FIG. 15, the cross sections of the spokes 296 are illustrated in descending order of thickness x, from left to right, with the number of the spoke indicated beneath its cross section. The index mark 290 employed for making a dial setting of the gauge wheel 274 is located at the 12 o'clock position of the wheel, whereas the spoke abutting the table 144 is midway between the six and nine o'clock position (see FIG. 9). The proper dial setting for each abutment spoke thickness x is represented at the top of the chart of FIG. 15. Thus, in the illustrative embodiment, a dial setting of zero, with the zero-numbered spoke in the 12 o'clock position, places spoke number 5, having the thickness x shown on the chart, in the movement path of the table 144. Setting spoke number 1 at the index mark 290 places spoke number 6 in the movement path, and so on, as represented in FIG. 15.

Both the longitudinal travel of the blank mount 142, and the depth of the recess 50 cut in a blade blank 32 increase with increasing dial setting. In the illustrative embodiment, when the dial setting is 0 and spoke number 5 is in the movement path of the table 144, the cutter 130 is at the distal edge of the blade blank 32, so that no cut will be made upon operation of the cutter. Successive dial settings 1 through 7 provide for making cuts of increasing length, in 0.025 inch increments, as described in greater detail hereinafter.

Referring to FIGS. 1 and 2, a safety shield or guard 300 is removably mounted on the bedplate 62, between the cutter and key blade mounting assemblies 42 and 44. The shield 300 includes an L-shaped support bracket 302 seated on the bedplate 62, and a transparent plastic arch member 304 secured to the upstanding portion of the bracket by bolts 306 and extending upwardly therefrom, to encompass the cutter 130 and the area adjacent thereto. The foot of the bracket 302 is oriented on the bedplate 62 by locating pins 308 extending upwardly from the bedplate into the bracket. The shield is fastened in place by a thumbscrew 310, which extends through a slot 312 in the foot of the bracket, into threaded engagement with the bedplate.

Figures 16, 17:
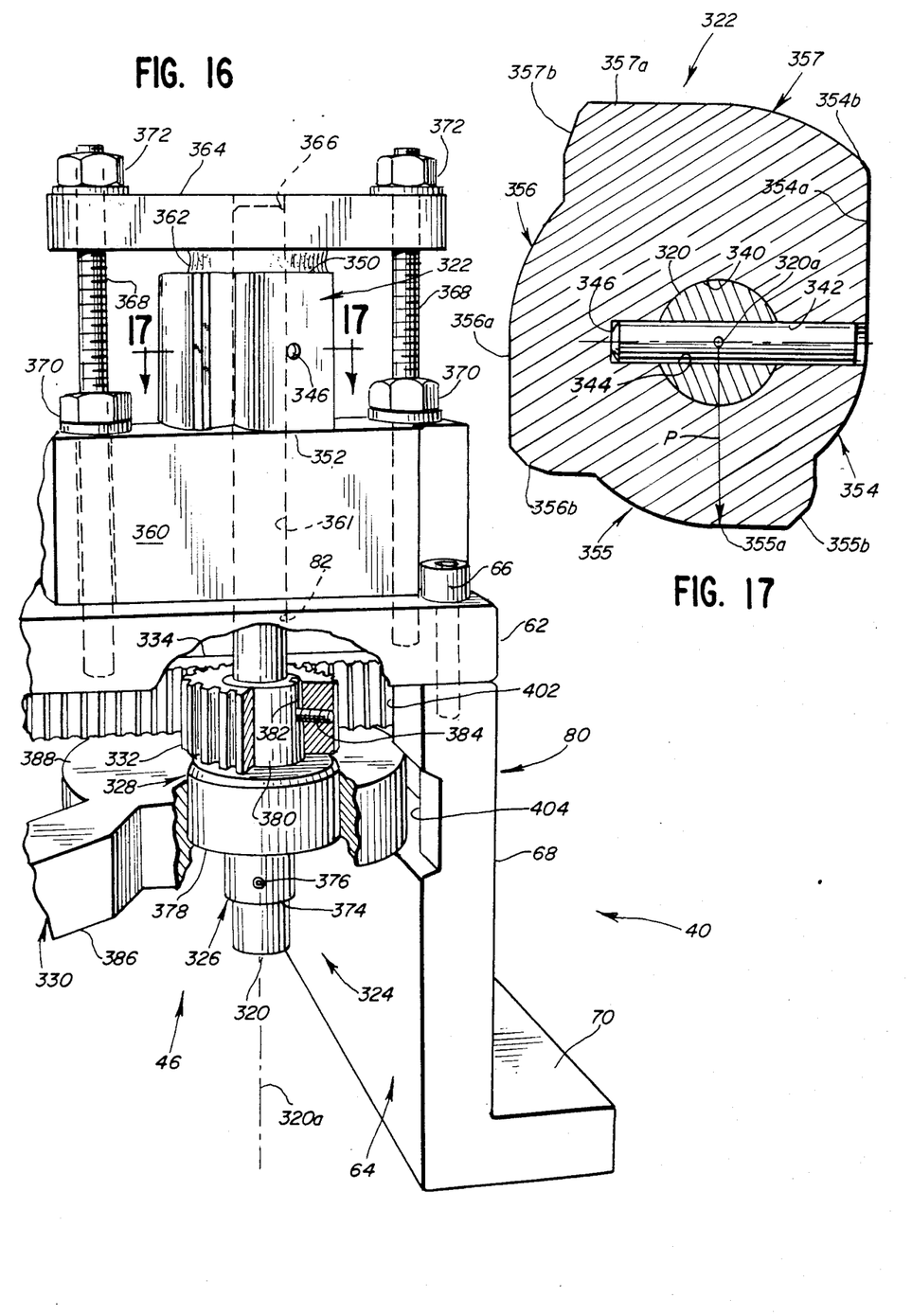
FIG. 16 is an enlarged fragmentary perspective view of the machine, with parts broken away, showing parts of an operating mechanism therein.
FIG. 17 is a further enlarged cross-sectional view of an indexing cam in the operating mechanism, taken substantially on line 17—17 of FIG. 16.

Referring to FIGS. 1, 16 and 17, the operating mechanism 46 includes a cylindrical cam shaft 320 having a longitudinal axis 320a and extending vertically through the bedplate 62, a cutter mount indexing cam 322 fixedly mounted on the shaft above the bedplate, and a slip clutch 324 mounted on the shaft below the bedplate, the clutch having a part 326 fixed to the shaft and a part 328 rotatable on the shaft. The operating mechanism 46 further includes an operating handle 330 fixedly connected to the rotatable clutch part 328, a pinion 332 fixedly mounted on the rotatable clutch part 328, and a blank mount drive rack 334 mounted on the bedplate 62 therebeneath, and drivingly engaged by the pinion 332.

The cam 322 is provided with a vertical cylindrical cam shaft bore 340 and an intersecting transverse pin bore 342, which aligns with a pin bore 344 in the cam shaft 320. A crosspin 346 is inserted in the aligned pin bores 342 and 344, to secure the cam 322 to the cam shaft 320 for rotation therewith about the axis 320a, which is common to the shaft 320 and the shaft bore 340.

The cam 322 has flat, parallel upper and lower, normally horizontal surfaces 350 and 352, respectively. The cam 322 has four radially projecting lobes 354–357, arranged successively around the perimeter of the cam in clockwise order, as viewed in FIG. 17, and extending longitudinally of the cam, in parallel relation to the axis 320a of the shaft bore 340, for the height of the cam. The successive lobes 354–357 have respective normally vertical planar indexing surfaces 354a–357a thereon, which increase in their perpendicular distances P from the axis 320a incrementally, in numerically increasing order. The lobes 354–357 have respective empirically derived camming surfaces 354b–357b, at the leading ends of the lobes, during normal rotation in the counterclockwise direction, as viewed in FIG. 17. The camming surfaces 354b–357b are contoured so as to provide a relatively smooth transition from each of the indexing surfaces 354a–357a to the succeeding indexing surface.

A cam supporting block 360 having a cylindrical bore 361 is mounted on the upper surface of the bedplate 62. The cam shaft 320 is journalled for rotation in the bore 361. The lower surface 352 of the cam 322 is seated on the upper surface of the block 360. A friction washer 362, of leather, fibrous material or the like, is seated on the upper surface 350 of the cam. An elongate pressure bar 364 having a central cylindrical shaft opening 366 therethrough is seated on the friction washer 362. Stud bolts 368 threadedly engage the bedplate 62, and extend freely through the supporting block 360 and the pressure bar 364. The block 360 is secured to the bedplate 62 by lower nut and washer combinations 370, which engage the bolts 368. Upper nut and washer combinations 372 engage the bolts 368 and bear on the pressure bar 364, adjustably, for applying light pressure from the bar to the friction washer 362, in turn providing frictional resistance to turning of the cam 322. The cam shaft 320 extends freely through the washer 362, and is received in the opening 366 in the pressure bar 364.

The fixed clutch part 326 includes a sleeve portion 374, which is fixedly secured to the cam shaft 320 by means of a set screw 376. Rotation of the fixed clutch part 326 therefore serves to rotate the cam shaft. The rotatable clutch part 328 includes an enlarged cylindrical rotatable body 378 and a reduced collar 380 rotated thereby. Rotation of the clutch body 378 in either direction about its axis serves to rotate the collar 380. Rotation of the clutch body 378 in the counterclockwise direction, as viewed in FIG. 16, causes the body to engage the fixed clutch part 326, and rotate it and the cam shaft 320 counterclockwise about the axis 320a of the shaft. Rotation of the clutch body 378 in the clockwise direction causes the body to slip on the fixed clutch part 326, so that it and the cam shaft 320 do not turn.

The collar 380 is provided with a longitudinal slot 382 in its outer surface. The pinion 332 is received around the collar 380, and fixedly secured thereto by a set screw 384 extending through the pinion and received in the slot 382. The pinion 332 meshes with the rack 334, for imparting reciprocal longitudinal movement thereto.

Referring to FIGS. 8 and 16, the operating handle 330 includes a lever arm 386 and an integral split ring-type head 388. The head 388 includes a pair of spaced apart lugs 390, 391, which are adjustably connected together by a bolt 392. The head 388 defines a substantially circular opening 394, which receives therein the clutch body 378. With the lug bolt 392 suitably tightened, the operating handle 330 thereby is rigidly connected to the clutch body 378, for rotating the body in either direction, by appropriately moving the lever arm 386.

Referring to FIGS. 1, 8, 9, and 16, the rack 334 is slidably mounted in two transversely extending, longitudinally spaced apart mounting blocks 396 and 398, each provided with a rectangular rack-receiving recess 400 (FIG. 9) in its upper surface. As illustrated in FIG. 16 for one leg 64, each leg of the base 40 is provided with an opening or recess 402 at the upper end of its upright section 68, to accommodate longitudinal movement of the rack 334. The upright leg section 68 adjacent to the operating handle 330 also is cut away and relieved adjacent to the rack opening 402, as indicated at 404, in the illustrative embodiment, to accommodate the operating handle 330 and movement thereof.

A connecting plate 410 is fixedly secured to the rack 334 on the bottom thereof, by bolts 412. A connecting pin 414 is connected to the plate 410 and extends upwardly therefrom. The connecting pin 414 extends through the registering bedplate and baseplate slots 84 and 161, and is received in the bottom recess 167 in the blank mount table 144. In this manner, the blank mount 142 is connected to the rack 334 for conjoint reciprocal movement longitudinally of the machine 30.

Referring to FIGS. 1-11, 14 and 18, operation of the machine 30 commences with the blank mount 142 latched in its retracted position, illustrated in FIGS. 1, 2 and 8, by the catch 256, the catch pin 262 (FIG. 9) of which is received in the table notch 266 for that purpose. The blade blank clamp bar 226 (see FIG. 10) is rotated on the bolt 230 to an out-of-the-way position, towards the back side 76 of the machine, and the key blank 34 is mounted on the holder 152. The blade blank 32 is inserted in the slot 222 of the raised key bed section 220, while the locating nib 224 is received in the retention opening 39 in the blank. The clamp bar 226 next is restored to the operating position illustrated in FIGS. 1, 2 and 10, and the screw clamp 232 is tightened, to cause the foot 238 thereof to bear on the blade blank 32 and rigidly clamp it in place. The key handle 60 is received over the handlereceiving section 218 of the key bed 216, which provides clearance for the handle while the entire key blank 34 is supported by the raised section 220 and the screw clamp 232 during cutting operations.

The gauge wheel 274 is set appropriately for cutting the first recess 50 in the blade blank 32. Initially, it may be desirable to verify the accuracy of the machine settings. This may be done commencing with the dial setting of 0, i.e., positioning spoke No. 0 at the index mark 290, which results in the interposition of spoke No. 5 in the path of the table 144, in the manner illustrated in FIG. 9. As described above, spoke No. 5 is the thickest of the spokes, and it will arrest the longitudinal movement of the blank mount 142 at the shortest distance of travel of the mount. The mount 142 should be arrested when the distal end 52 of the blade blank 32 substantially abuts on the free end of the cutter 130, with no overlapping of the two for cutting purposes. Otherwise, adjustment of the machine settings is needed. The remaining spokes arrest the movement of the blank mount 142 with increasing travel, and increasing overlap of the blade blank 32 and the cutter 130, as the dial setting is adjusted from 1 through 7. Following any initial verification at the zero dial setting, the operator rotates the dial to a selected one of the settings 1 through 7, according to the depth of the recess 50 to be cut in a land 48 on the blade blank 32.

Figures 18, 19, 20, 21:
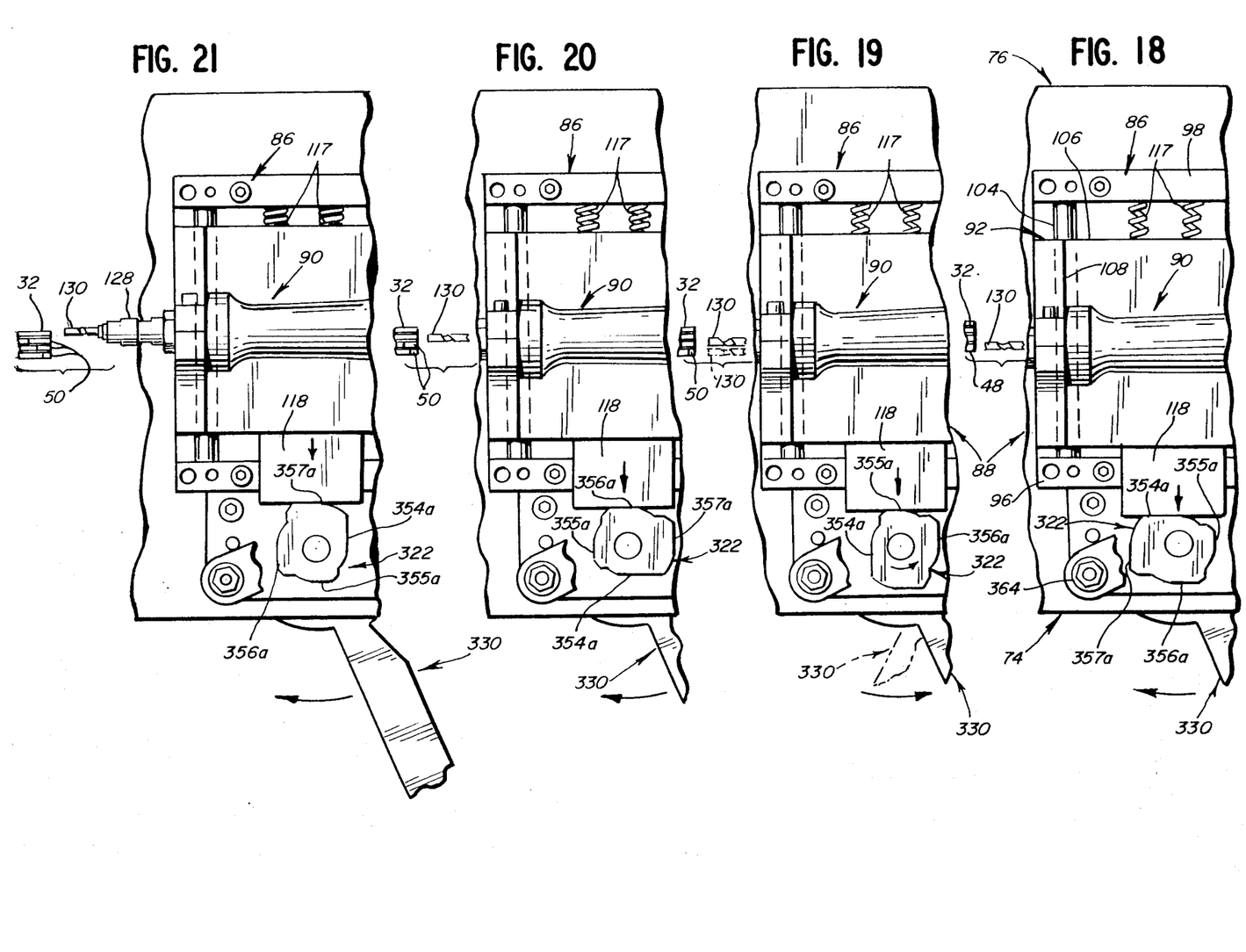
FIGS. 18 through 21 are fragmentary top plan views of the machine, with parts broken away, sequentially illustrating the relative positions of the indexing cam, the cutter mount and a cutter mounted thereon, and a key blade blank as it is supported in the machine, in the course of cutting recesses in the blank across one side thereof.

The cam 322 initially is set with the indexing surface 354a thereof having the shortest perpendicular distance P from the axis 320a, in abutting engagement with the cam follower 118, as illustrated in FIGS. 2 and 18. With the drive unit motor 124 energized to rotate the cutter 130, the machine 30 is ready for operation, to cut a recess 50 in the land 48 nearest the front side 74 of the machine.

The blank mount catch 256 is pulled out of engagement of its catch pin 262 in the table notch 266, while the lever arm 386 of the operating handle 330 is grasped by the operator. The lever arm 386 is pulled towards the left side 78 of the machine, rotating the handle 330 and the pinion 332 in the clockwise direction (referring to FIGS. 1, 2, 16 and 18). The rotation of the pinion 332 causes the rack 334 to move from left to right, thereby advancing the blank mount 142 towards the cutter mount 88. Continued advancement causes the blade blank 32 to move into cutting engagement with the free end of the cutter 130, which cuts a longitudinal recess 50 in the blade blank 32, until the table 144 abuts on the gauge wheel spoke 296 in its movement path, as illustrated in FIG. 8. This completes the cutting of one recess 50. The advancement of the blank mount 142 is assisted by the force of the extension springs 252, tending to urge the blade blank 32 against the cutter 130.

The operator then reverses the movement of the lever arm 386, against the tension of the extension springs 252, causing the handle 330 to rotate in the counterclockwise direction, as schematically illustrated in FIG. 19. The resulting rotation of the pinion 332 causes the rack 334 to move from right to left (in FIGS. 1, 8 and 16), thereby retracting the blank mount 142 from the cutter mount 88. The blank mount 142 is moved longitudinally outwardly into the position illustrated in FIGS. 1, 2 and 9, where it is once more engaged and held by the catch 256.

The counterclockwise rotation of the handle 330, illustrated in FIG. 19, results in the interengagement of the fixed and rotatable clutch parts 326 and 328, as described above. The cam shaft 320 and the cam 322 thereon then rotate 90 degrees in the counterclockwise direction, until the handle 330 is at the end of its stroke, adjacent to the upright leg section 68 at the right side 80 of the machine. At this time, the indexing surface 355a of the cam, which is at the next shortest distance P from the axis 320a (FIG. 17), is in abutting engagement with the cam follower 118. During the rotation of the cam 322, the friction washer 362 acts against the upper cam surface 350, to control its rotation as affected by the force of the cutter mount-biasing compression springs 117, and thereby minimize "slap" between the cam follower 118 and the indexing surface 355a coming into engagement therewith.

The resulting incremental front-to-rear transverse movement of the cutter mount 88 results in corresponding transverse movement of the cutter 130, as illustrated by the change in position of the cutter from the position shown in broken lines to that shown in full lines in FIG. 19. The cutter 130 thus is adjusted transversely with respect to the blade blank 32, and then is ready to cut a second longitudinal recess 50 in a second land 48, that is, the second land inwardly from the edge of the blade blank nearer to the front side 74 of the machine.

The operator then sets the gauge wheel 274 according to the desired key code, and repeats the foregoing procedure, to provide a recess 50 in the second land 48, and then rotate the cam 322 to index the cutter mount 88 into its third transverse adjustment position with respect to the blade blank 32, illustrated in FIG. 20. Two further repetitions of the above-described procedure cause a longitudinal recess 50 to be provided in the third land 48, the cutter mount 88 to be indexed into the position illustrated in FIG. 21, and a recess 50 to be provided in the fourth land 48 on the one side of the blade blank 32. When the handle 330 is last restored to its starting position, illustrated in FIG. 1, the indexing surface 354a of the cam 322 initially abutting on the cam follower 118 is restored to its abutting position, and the cutter mount 88 and the cutter 130 are restored to their starting positions, illustrated in FIG. 18.

In order to cut recesses 50 in the lands 48 on the opposite side of the partially cut blade blank 32, to provide the finished key 36 illustrated in FIGS. 5 and 6, the blade blank 32 next is turned over on the machine 30, by rotating the blank holder 152 through an angle of 180 degrees in its housing 150, to the position illustrated in FIG. 12. For this purpose, and with the catch pin 262 of the blank mount catch 256 engaging the table 144 in its notch 266 once more, as illustrated in FIG. 2, the latch bar 194 on the housing body 174 is withdrawn from the upper latching notch 243 in the latch plate 242, by manually grasping and moving the handle 200 against the tension of the wire spring 206, into the latch bar position of FIG. 10. The blank holder 152 is rotated manually through an angle of 180 degrees, as by turning the retainer cap 248, and the handle 200 is released, for entry of the latch bar 194 into the opposite latching notch 243 under the force of the spring 206.

The entire cutting procedure described above and illustrated in FIGS. 18–21 is repeated, to cut four longitudinal tumbler-receiving recesses 50 in the lands 48 on the second side of the blank. The holder 152 then is restored to the starting position illustrated in FIG. 10, by removing the latch bar 194 from the upper latching notch 243, rotating the holder through an angle of 180 degrees, and permitting the latch bar to enter the opposite latching notch 243. The resulting finished key 36 is removed from the holder 152, by loosening the screw clamp 232, rotating the clamp bar 226 to an out-of-the-way position, and lifting the key out of the key bed 216. The complete manufacturing procedure is repeated, to produce numerous keys successively, each key preferably being provided with tumbler-receiving recesses forming bittings according to a different key code, for maximum security.

It will be apparent that the blade blank 32 may be cut in the machine 30 without the handle 33 attached thereto, and the handle may be attached to the finished bitted blade 38, if such procedure be preferred. The recesses 50 may be provided on but one side of a blade, and, with suitable modifications, the number of recesses 50 provided in either side may be varied, as may be the lengths of the recesses. Flat keys for other types of locks may be made with the machine in similar ways. In this connection, it will be apparent that the indexing means, particularly, the cam 322, the variable stop means, particularly, the gauge wheel 274, and various mounting and spacing parts may be changed or modified, for making keys other than the illustrative key 36. It will be apparent to those skilled in the art further that various other changes and modifications may be made in the illustrative embodiment, within the spirit and scope of the invention. It is intended that all such changes and modifications be included within the scope of the appended claims.

We claim:

1. A flat key-cutting machine which comprises:
   a mount for a flat key blade blank,
   a mount for a cutter,
   means mounting said blank mount and said cutter mount for movement relative to each other for cutting a longitudinal tumbler-receiving recess in one side of a flat key blade blank mounted on the blank mount with a cutter mounted on the cutter mount during said relative movement, and
   means mounting said blank mount and said cutter mount for relative rectilinear transverse movement into successive adjustment positions relative to each other to adjust the position of a cutter mounted on the cutter mount transversely in a plane extending across said one side of a flat key blade blank mounted on the blank mount, whereby a plurality of recesses receiving coplanar tumblers therein may be cut in the blank successively across said one side thereof.

2. A machine as defined in claim 1 and including means for indexing said blank mount and said cutter mount relative to each other into said adjustment positions thereof.

3. A machine as defined in claim 2 and including means for moving said blank mount and said cutter mount reciprocally relative to each other for relatively advancing and retracting the blade blank with respect to the cutter for cutting such recesses in the blank, and means coupling said moving means with said indexing means for effecting said indexing cooperatively with the retraction of the blank.

4. A machine as defined in claim 3 wherein said indexing means includes cam means and cam follower means for adjusting the position of one of said mounts.

5. A machine as defined in claim 3 wherein one of said mounts is moved longitudinally of the blade blank by said moving means for cutting said recesses in the blank, and including variable stop means engaging said one mount to arrest its longitudinal movement and thereby determine the length of each recess.

6. A machine as defined in claim 5 wherein said indexing means includes cam means and cam follower means for adjusting the position of one of said mounts.

7. A machine as defined in claim 1 and including a holder for a blade blank, and means pivotally mounting said holder on said blank mount for 180-degree rotation about the longitudinal axis of the blank, whereby said recesses may be cut in opposite sides of the blank.

8. A machine as defined in claim 5 and including a holder for a blade blank, and means pivotally mounting said holder on said blank mount for 180-degree rotation about the longitudinal axis of the blank, whereby said recesses may be cut in opposite sides of the blank.

9. A machine as defined in claim 8 wherein said indexing means includes cam means and cam follower means for adjusting the position of the mount other than said one mount.

10. A flat key-cutting machine which comprises:
    a mount for a flat key blade blank,
    a mount for a cutter,
    means mounting said blank mount for movement thereof longitudinally of a flat key blade blank mounted thereon, for cutting a longitudinal tumbler-receiving recess in one side of the blank with a cutter mounted on the cutter mount during said longitudinal movement, and
    means mounting said cutter mount for rectilinear transverse movement into successive adjustment positions relative to said blank mount to adjust the position of a cutter mounted on the cutter mount transversely in a plane extending across said one side of a flat key blade blank mounted on the blank mount, whereby a plurality of recesses receiving coplanar tumblers therein may be cut in the blank successively across said one side thereof.

11. A machine as defined in claim 10 and including means for indexing said cutter mount into said adjustment positions thereof.

12. A machine as defined in claim 11 wherein said indexing means includes cam follower means connected to the cutter mount, and cam means engageable with the follower means.

13. A machine as defined in claim 11 and including means for moving said blank mount reciprocally and longitudinally of a blade blank mounted thereon, for advancing and retracting the blade blank with respect to the cutter for cutting said recesses in the blank, and means coupling said moving means with said indexing means for effecting said indexing cooperatively with the retraction of the blank.

14. A machine as defined in claim 13 wherein said moving means comprises a rack connected to the blank mount, a gear engaging the rack, and a lever connected to the gear; said indexing means includes cam follower means connected to the cutter mount, and cam means engageable with the follower means; and said coupling means comprises a shaft and slip-clutch means on the shaft, for coupling the cam means with the lever.

15. A machine as defined in claim 10 and including variable stop means engaging the blank mount to arrest its longitudinal movement and thereby determine the length of each recess, said stop means comprising a gauge wheel rotatable about its axis and having a plurality of spokes arranged for abutting engagement alternatively with the blank mount, said spokes engaging the blank mount at differing distances of travel thereof.

16. A machine as defined in claim 14 and including variable stop means engaging the blank mount to arrest its longitudinal movement and thereby determine the length of each recess, said stop means comprising a gauge wheel rotatable about is axis and having a plurality of spokes arranged for abutting engagement alternatively with the blank mount, said spokes engaging the blank mount at differing distances of travel thereof.

17. A machine as defined in claim 16 and including a holder for a blade blank, and means pivotally mounting said holder on said blank mount for 180-degree rotation about the longitudinal axis of the blank, whereby said recesses may be cut in opposite sides of the blank.

* * * * *